(12) United States Patent
Jang et al.

(10) Patent No.: US 12,174,447 B2
(45) Date of Patent: Dec. 24, 2024

(54) LENS DEVICE

(71) Applicant: CHICONY ELECTRONICS CO., LTD., New Taipei (TW)

(72) Inventors: Jin-Kae Jang, New Taipei (TW); Li-Hsing Tsai, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 731 days.

(21) Appl. No.: 17/495,275

(22) Filed: Oct. 6, 2021

(65) Prior Publication Data
US 2022/0357549 A1    Nov. 10, 2022

(30) Foreign Application Priority Data
May 5, 2021   (TW) ................. 110116296

(51) Int. Cl.
  *G02B 7/02*   (2021.01)
  *H04N 23/54*  (2023.01)
  *H04N 23/55*  (2023.01)

(52) U.S. Cl.
  CPC ............. *G02B 7/025* (2013.01); *G02B 7/022* (2013.01); *H04N 23/54* (2023.01); *H04N 23/55* (2023.01)

(58) Field of Classification Search
  CPC ................. G02B 7/025; G02B 7/022
  See application file for complete search history.

(56) References Cited

FOREIGN PATENT DOCUMENTS

CN          111007619 A  *  4/2020  ............. G02B 7/022

OTHER PUBLICATIONS

CN-111007619-A, translation (Year: 2020).*

* cited by examiner

*Primary Examiner* — Wen Huang
(74) *Attorney, Agent, or Firm* — MUNCY, GEISSLER, OLDS & LOWE, P.C.

(57) ABSTRACT

The present disclosure discloses a lens device, which comprises a holder, a calibrated member, a lens module and a clamping member. The holder comprises a mounting plane and an accommodating portion. The calibrated member is disposed on the mounting plane of the holder. The calibrated member has a through hole and an internal thread. The lens module comprises an external thread. The lens module passes through the through hole of the calibrated member, the external thread and the internal thread fit each other, and part of the lens module is disposed in the accommodating portion. The clamping member comprises an engagement portion and an elastic arm. The engagement portion clamps the holder, and part of the elastic arm touches a surface of the calibrated member opposite to the mounting plane.

15 Claims, 8 Drawing Sheets

LENS DEVICE

BACKGROUND

1. Technical Field

The present disclosure relates to an optical device, and more particularly, to a lens device.

2. Description of the Related Art

Generally, many kinds of electronic products, such as cameras, dashcams, mobile phones, tablet or notebook computers and other electronic devices, have one or more lens devices to capture images outside the electronic product.

The most important function of the lens device is to capture clear images with a correct focal length. Lens focusing of the lens device can be performed by using an active alignment operation. The active alignment operation mainly entails placing a lens on a holder and then adjusting the relative positions of the lens and the holder to focus the lens. In addition, an image sensor is provided at the bottom of the holder. The image of an object can be made to fall exactly on the image sensor by adjusting the relative positions of the lens and the holder. Finally, the lens and the holder are fixed to each other with an adhesive to complete the active alignment operation.

However, the strength or structure of the adhesive can easily be weakened due to duration of use or environmental factors such as temperature and humidity, thereby causing the relative positions of the lens and the holder to shift. A change in the relative positions of the lens and the holder will cause loss of focus and blurring of the image.

SUMMARY

In view of the above problems, the main object of the present disclosure is to provide a lens device, and the novel structure of a clamping member solves the problem that the relative positions of a lens and a holder of a conventional lens device can easily shift.

In order to achieve the above object, the present disclosure provides a lens device, which comprises a holder, a calibrated member, a lens module and a clamping member. The holder comprises a mounting plane and an accommodating portion. The calibrated member is disposed on the mounting plane of the holder. The calibrated member has a through hole and an internal thread. The lens module comprises an external thread. The lens module passes through the through hole of the calibrated member, the external thread and the internal thread fit each other, and part of the lens module is disposed in the accommodating portion. The clamping member comprises an engagement portion and an elastic arm. The engagement portion clamps the holder, and part of the elastic area touches a surface of the calibrated member opposite to the mounting plane.

According to an embodiment of the present disclosure, the elastic arm extends from the engagement portion and has a pressing portion, and the pressing portion touches the surface of the calibrated member opposite to the mounting plane.

According to an embodiment of the present disclosure, one end of the elastic arm connects to the engagement portion, and the other end of the elastic arm comprises the pressing portion.

According to an embodiment of the present disclosure, the elastic arm has a first positioning portion, the calibrated member has a second positioning portion, and the first positioning portion fits the second positioning portion.

According to an embodiment of the present disclosure, the holder comprises an extension portion, and the engagement portion clamps the extension portion.

According to an embodiment of the present disclosure, the engagement portion is located on at least one end of the clamping member, and the engagement portion has at least one bend portion. The bend portion corresponds to an edge of the extension portion.

According to an embodiment of the present disclosure, the engagement portion has a third positioning portion, and the holder has a fourth positioning portion. The third positioning portion fits the fourth positioning portion.

According to an embodiment of the present disclosure, the lens device further comprises an adhesive. The adhesive is disposed on the mounting plane of the holder and connects the holder and the calibrated member.

According to an embodiment of the present disclosure, the lens device further comprises an image sensor. The image sensor is disposed on a bottom side of the accommodating portion and corresponds to the lens module.

In order to achieve the above object, the present disclosure provides a lens device, which comprises a holder, a lens module and a clamping member. The holder comprises a mounting plane and an accommodating portion. The lens module comprises a connection portion. Part of the lens module is disposed in the accommodating portion, and the connection portion is disposed on the mounting plane. The clamping member comprises an engagement portion and an elastic arm. The engagement portion clamps the holder, and part of the elastic arm touches a surface of the connection portion opposite to the mounting plane.

According to an embodiment of the present disclosure, the elastic arm extends from the engagement portion and has a pressing portion. The pressing portion touches the surface of the connection portion opposite to the mounting plane.

According to an embodiment of the present disclosure, one end of the elastic arm connects to the engagement portion, and the other end of the elastic arm comprises the pressing portion.

According to an embodiment of the present disclosure, the holder comprises an extension portion, and the engagement portion clamps the extension portion.

According to an embodiment of the present disclosure, the engagement portion is located on at least one end of the clamping member, and the engagement portion has at least one bend portion. The bend portion corresponds to an edge of the extension portion.

According to an embodiment of the present disclosure, the lens device further comprises an adhesive. The adhesive is disposed on the mounting plane of the holder and connects the holder and the connection portion of the lens module.

As described above, according to the lens device of the present disclosure, the lens device comprises a clamping member, and the clamping member comprises an engagement portion and an elastic arm. The engagement portion clamps the holder and part of the elastic arm touches the calibrated member or the connection portion of the holder to fix the relative positions of the holder and the lens module. Specifically, the adhesive that connects the calibrated member and the lens module, or the adhesive that connects the holder and the lens module, may lose its function due to duration of use or environmental factors, thereby allowing the relative positions of the lens and the holder to shift. With the installation of the clamping member, the effect of preventing the relative positions of the base holder and the lens module from shifting due to failure of the adhesive can also be achieved.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1:
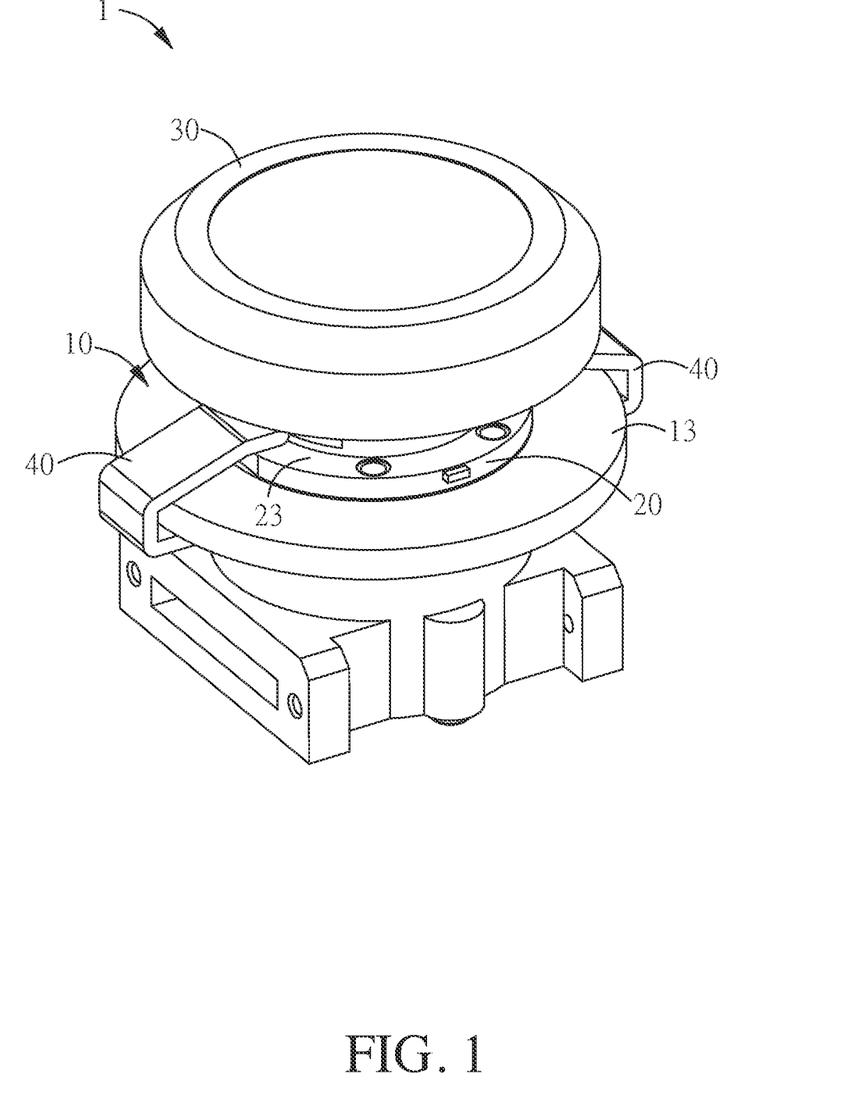
FIG. 1 illustrates a schematic view of a lens device according to the first embodiment of the present disclosure.
Figure 2:
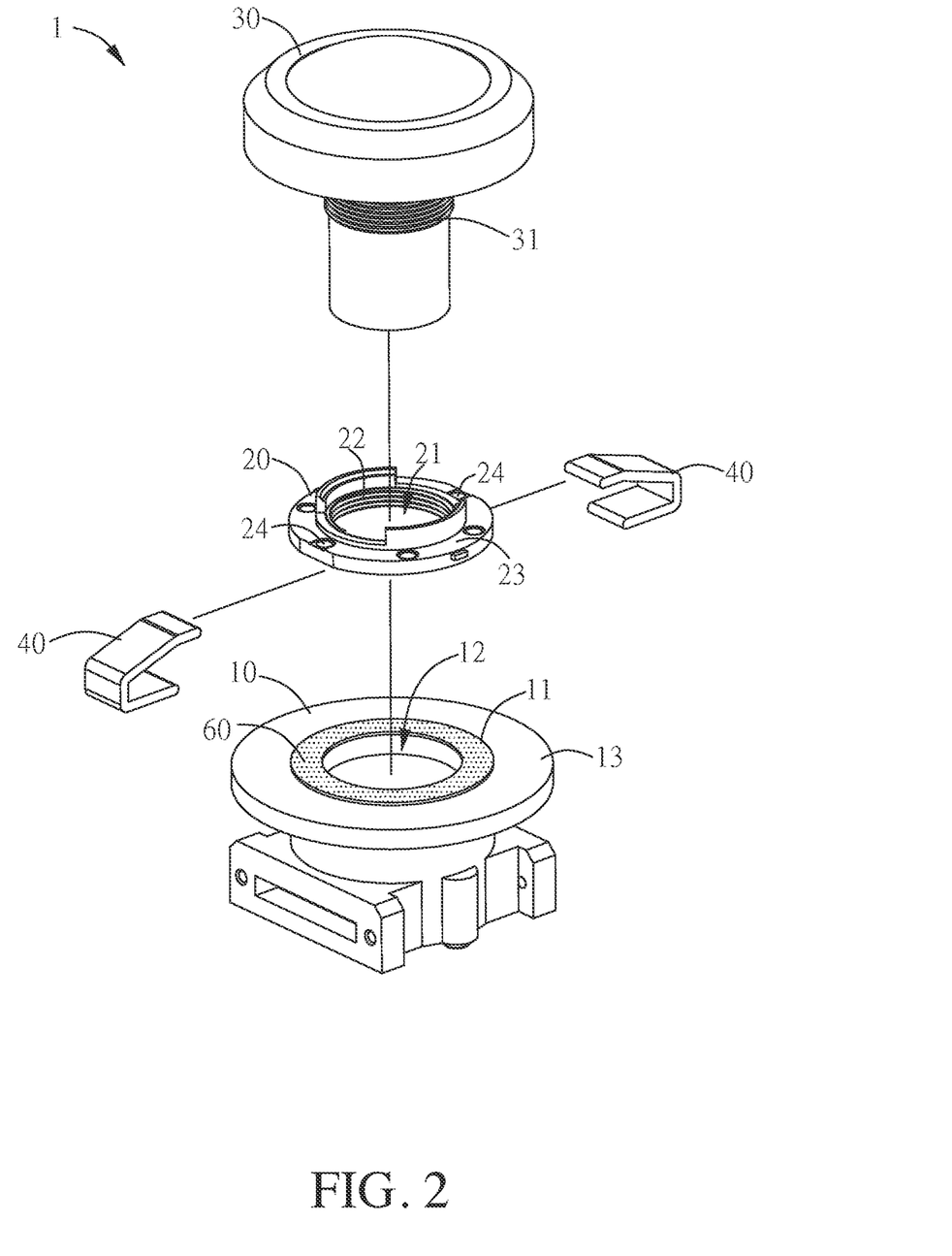
FIG. 2 illustrates an exploded view of the lens device shown in FIG. 1.
Figure 3:
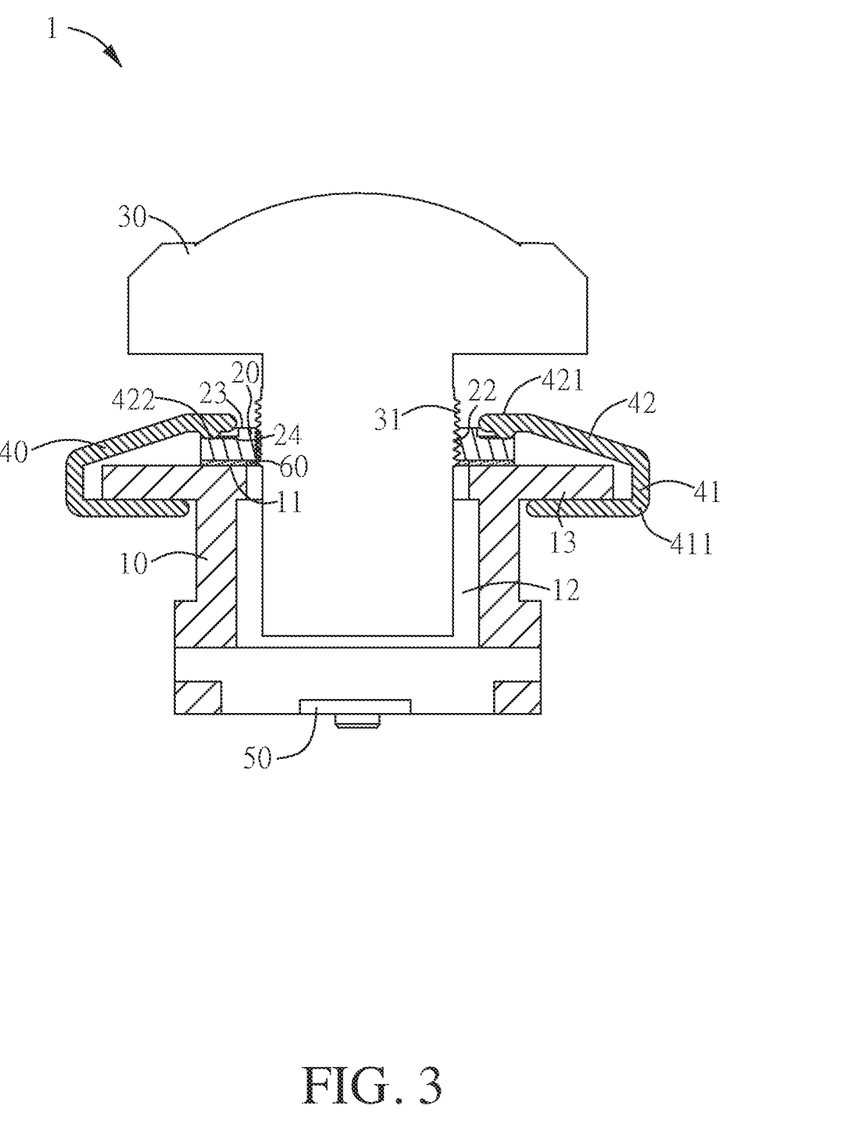
FIG. 3 illustrates a sectional view of the lens device shown in FIG. 1.

Please refer to FIG. 1, FIG. 2 and FIG. 3. FIG. 1 illustrates a schematic view of a lens device according to the first embodiment of the present disclosure; FIG. 2 illustrates an exploded view of the lens device shown in FIG. 1; and FIG. 3 illustrates a sectional view of the lens device shown in FIG. 1. In this embodiment, the lens device 1 comprises a holder 10, a calibrated member 20, a lens module 30 and at least one clamping member 40. The holder 10 comprises a mounting plane 11 and an accommodating portion 12. Specifically, the holder 10 of this embodiment is a cylindrical structure, so the central part of the holder 10 has a hollow accommodating portion 12 for accommodating the lens module 30. The holder 10 has an upper surface and a lower surface, and the upper surface of the holder 10 is referred to as the mounting plane 11 herein.

The calibrated member 20 has a through hole 21 and an internal thread 22, and the internal thread 22 is located on the inner wall of the through hole 21, as shown in FIG. 2. Preferably, the calibrated member 20 may be a ring structure. The calibrated member 20 is disposed on the mounting plane 11 of the holder 10, and the through hole 21 corresponds to the accommodating portion 12. Thus, the lens module 30 is able to pass through the through hole 21 of the calibrated member 20, and part of the lens module 30 is disposed in the accommodating portion 12. In brief, part of the lens module 30 passes through the through hole 21 of the calibrated member 20 and is accommodated in the accommodating portion 12 of the holder 10.

Furthermore, the lens module 30 comprises an external thread 31, which is located on an outer side wall of the lower part of the lens module 30. When part of the lens module 30 passes through the through hole 21, the external thread 31 of the lens module 30 fits the internal thread 22 of the calibrated member 20. The structure of the internal thread 22 and external thread 31 fitting each other not only fixes the calibrated member 20 and the lens module 30 in a screw-locked manner but also allows adjustment of an axial position of the lens module 30. In addition, the lens device 1 further comprises an image sensor 50, as shown in FIG. 3. The image sensor 50 is located on a bottom side of the accommodating portion 12. In other words, the image sensor 50 is adjacent to the lower surface of the holder 10 such that the image sensor 50 corresponds to the lens module 30. The vertical distance between the lens module 30 and the image sensor 50 can be modulated by the structure of the internal thread 22 and the external thread 31 fitting each other.

In another embodiment, after the lens module 30 is screwed into the calibrated member 20, the calibrated member 20 and the lens module 30 are provided on the holder 10 together. The calibrated member 20 is disposed on the mounting plane 11, and the lens module 30 is accommodated in the accommodating portion 12. Then the relative positions of the lens module 30 and image sensor 50 are adjusted to keep the lens module 30 and the image sensor 50 at a predetermined imaging focal length. In addition to the adjustment of the vertical distance between the lens module 30 and the image sensor 50, the relative positions of the lens module 30 and the image sensor 50 on the plane can be adjusted by moving the calibrated member 20 right and left. Finally, the calibrated member 20 is fixed to the mounting plane 11 of the holder 10, and at the same time, the lens module 30 is fixed in position to maintain the predetermined imaging focal length.

Preferably, the lens device 1 of this embodiment further comprises an adhesive 60. The adhesive 60 is disposed on the mounting plane 11 of the holder 10 to connect the holder 10 and the calibrated member 20. For example, the adhesive 60 may be pre-coated on the mounting plane 11 or injected between the mounting plane 11 and the calibrated member 20. In this embodiment, the adhesive 60 may be a UV cured adhesive or a heat cured adhesive, and the adhesive 60 is pre-coated on the mounting plane 11 of the holder 10. After focusing of the lens module 30, that is, after the lens module 30 is adjusted to the position in which the predetermined imaging focal length from the image sensor 50 is maintained, the adhesive 60 is cured by using light (UV) irradiation or heating to fix the relative positions of the holder 10, the calibrated member 20, the lens module 30 and the adhesive 60. At the same time, the lens module 30 is also fixed in position to maintain the predetermined imaging focal length from the image sensor 50.

Figure 4:
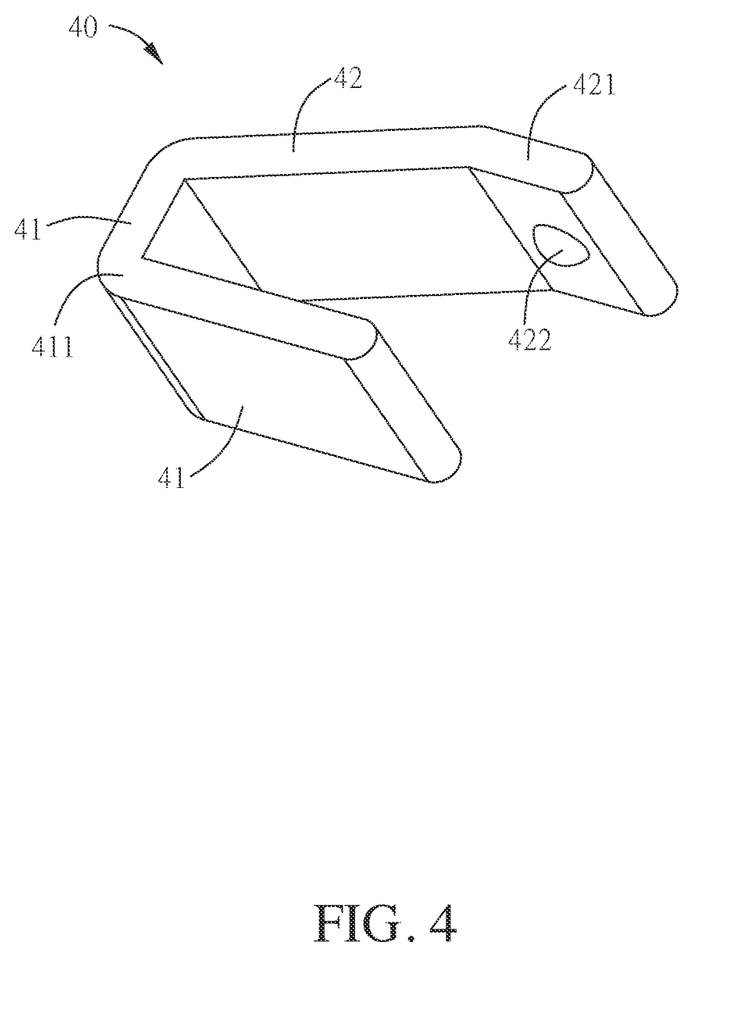
FIG. 4 illustrates an enlarged view of a clamping member shown in FIG. 2.

In this embodiment, the clamping member 40 is used to further fix the relative positions of the holder 10 and the calibrated member 20 and to prevent a shift in relative positions caused by a loss of function of the adhesive 60 due to the duration of use and environmental factors. Please refer to FIG. 3 and FIG. 4. FIG. 4 illustrates an enlarged view of a clamping member shown in FIG. 2. The clamping member 40 comprises an engagement portion 41 and an elastic arm 42. The engagement portion 41 clamps the holder 10. Preferably, the holder 10 of this embodiment comprises an extension portion 13, and the engagement portion 41 clamps the extension portion 13. Part of the elastic arm 42 touches a surface of the calibrated member 20 opposite to the mounting plane (i.e., an upper surface 23 of the calibrated member 20) such that the elastic area 42 can apply a force on the calibrated member 20, and the force is toward the mounting plane 11 (i.e., downward force). Due to the elasticity of the elastic arm 42, the elastic area 42 can be expanded and clamp the holder 10 and the calibrated member 20. After that, the clamping member 40 fixes the relative positions of the holder 10 and the calibrated member 20, thereby fixing the relative positions of the lens module 30 and the image sensor 50.

In this embodiment, the engagement portion 41 is located on one end of the clamping member 40, and the engagement portion 41 has at least one bend portion 411. The position of the bend portion 411 can be modulated according to the structure of the holder 10. For example, the bend portion 411 is provided according to the length and the height of the extension portion 13 such that the bend portion 411 is able to correspond to an edge of the extension portion 13. With the bend portion 411, the engagement portion 41 can fit onto the lower surface of the extension portion 13.

In addition, the elastic arm 42 extends from the engagement portion 41 such that the clamping member 40 forms a U-shaped structure. Furthermore, the elastic arm 42 has a pressing portion 421. One end of the elastic arm 42 connects to the engagement portion 41, and the other end of the elastic arm 42 comprises the pressing portion 421. The elastic arm 42 touches the upper surface 23 of the calibrated member 20 via the pressing portion 421. In other words, the engagement portion 41 and the pressing portion 421 are located at the two opposite ends of the clamping member 40 respectively. The engagement portion 41 is clamped and fixed to the extension portion 13 of the holder 10, and the pressing portion 421 touches the upper surface 23 of the calibrated member 20. Thus, the elastic arm 42 can apply force on the calibrated member 20, and the force is toward the mounting plane 11. Further, the relative positions of the holder 10 and the calibrated member 20 can be fixed, thereby keeping the lens module 30 and the image sensor 50 at a predetermined imaging focal length.

In another embodiment, the engagement portions 41 may be located at the two opposite ends of the clamping member 40, and the elastic arm 42 is located at the center of the engagement portions 41 at the two ends. The engagement portions 41 at the two ends clamp the holder 10, and the elastic arm 42 at the center touches the upper surface 23 of the calibrated member 20, thereby achieving the effect of fixing the relative positions of the holder 10 and the calibrated member 20.

Preferably, the lens device 1 of this embodiment comprises two clamping members 40. Preferably, the two clamping members 40 may be clamped at symmetrical positions of the holder 10, such as two opposite sides of the holder 10, to firmly fix the relative positions of the holder 10 and the calibrated member 20.

Preferably, the elastic arm 42 of this embodiment has a first positioning portion 422. Correspondingly, the calibrated member 20 has a second positioning portion 24. The first positioning portion 422 and the second positioning portion 24 fit each other. That is, the positions and the configurations of the first positioning portion 422 and the second positioning portion 24 match each other. For example, the first positioning portion 422 is located at the pressing portion 421 and is a convex portion. Correspondingly, the second positioning portion 24 is located at the upper surface 23 of the calibrated member 20 and is a concave portion. Furthermore, the numbers of the first positioning portions 422 and the second positioning portions 24 are the same as the number of the clamping members 40, and this embodiment takes two as an example. Preferably, the two second positioning portions 24 can be located at symmetrical positions of the calibrated member 20. When the clamping member 40 is being assembled, the first positioning portion 422 is aligned with the second positioning portion 24, and the engagement portion 41 is engaged with the extension portion 13 of the holder 10. Because the two second positioning portions 24 are disposed symmetrically, the two clamping members 40 are able to symmetrically clamp the holder 10 and the calibrated member 20.

Figure 5:
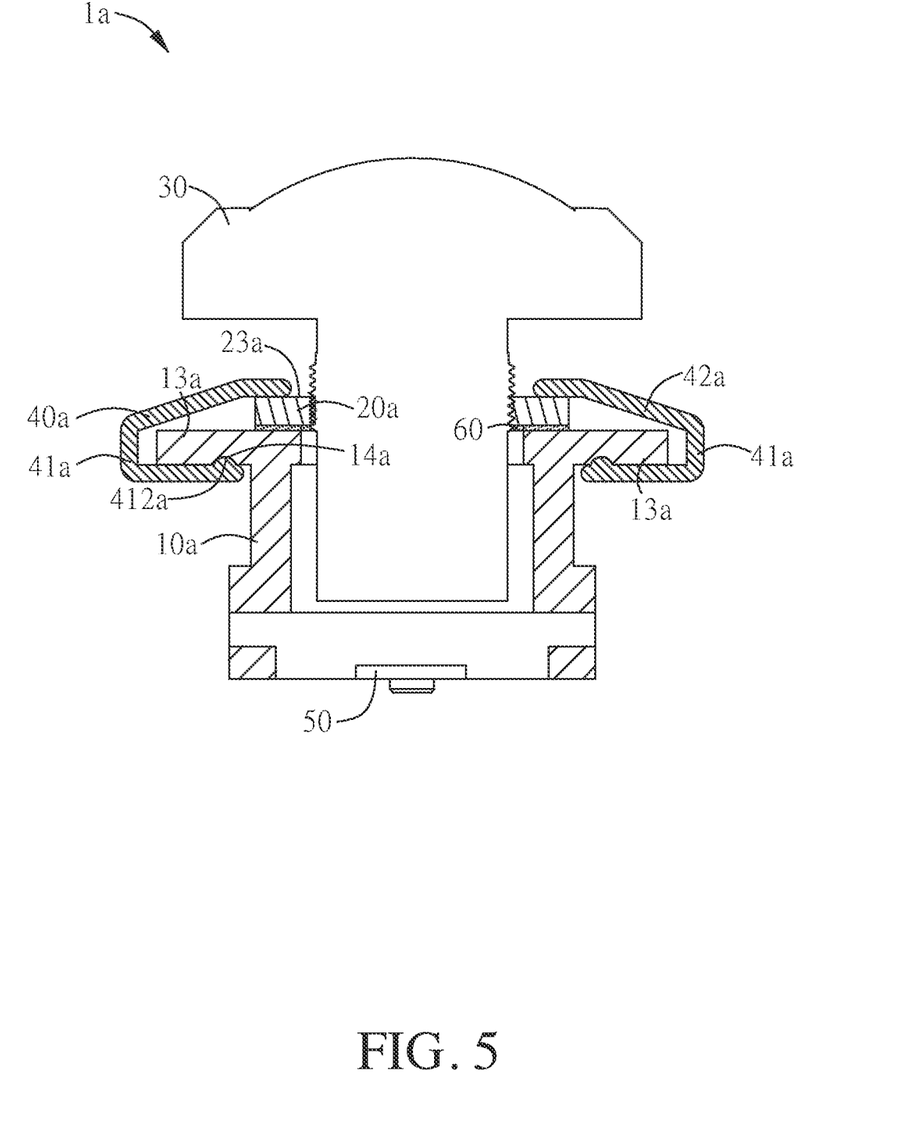
FIG. 5 illustrates a sectional view of a lens device according to the second embodiment of the present disclosure.

Please refer to FIG. 5. FIG. 5 illustrates a sectional view of a lens device according to the second embodiment of the present disclosure. The difference between the lens device 1a of this embodiment and the lens device 1 of the previous embodiment is the positions of the positioning portions provided. Thus, a holder 10a, a calibrated member 20a and a clamping member 40a of this embodiment are different from those of the previous embodiment. The other elements of the second embodiment are the same as those of the first embodiment, with the same reference numerals denoting the same elements. In this embodiment, the engagement portion 41a of the clamping member 40a has a third positioning portion 412a. In other words, the third positioning portion 412a is located at the engagement portion 41a. Correspondingly, the holder 10a has a fourth positioning portion 14a. The third positioning portion 412a and the fourth positioning portion 14a fit each other. That is, the positions and the configurations of the third positioning portion 412a and the fourth positioning portion 14a match each other. For example, the third positioning portion 412a is located on the surface of the engagement portion 41a facing the extension portion 13a, and the third positioning portion 412a is a convex portion. Correspondingly, the fourth positioning portion 14a is located on the lower surface of the extension portion 13a and is a concave portion.

When assembling the clamping member 40a, the third positioning portion 412a is aligned with the fourth positioning portion 14a, and the engagement portion 41a is engaged with the extension portion 13a. Then the elastic arm 42a touches an upper surface 23a of the calibrated member 20a such that the elastic arm 42a can apply a downward force on the calibrated member 20a, thereby fixing the relative positions of the holder 10a and the calibrated member 20a.

Figure 6:
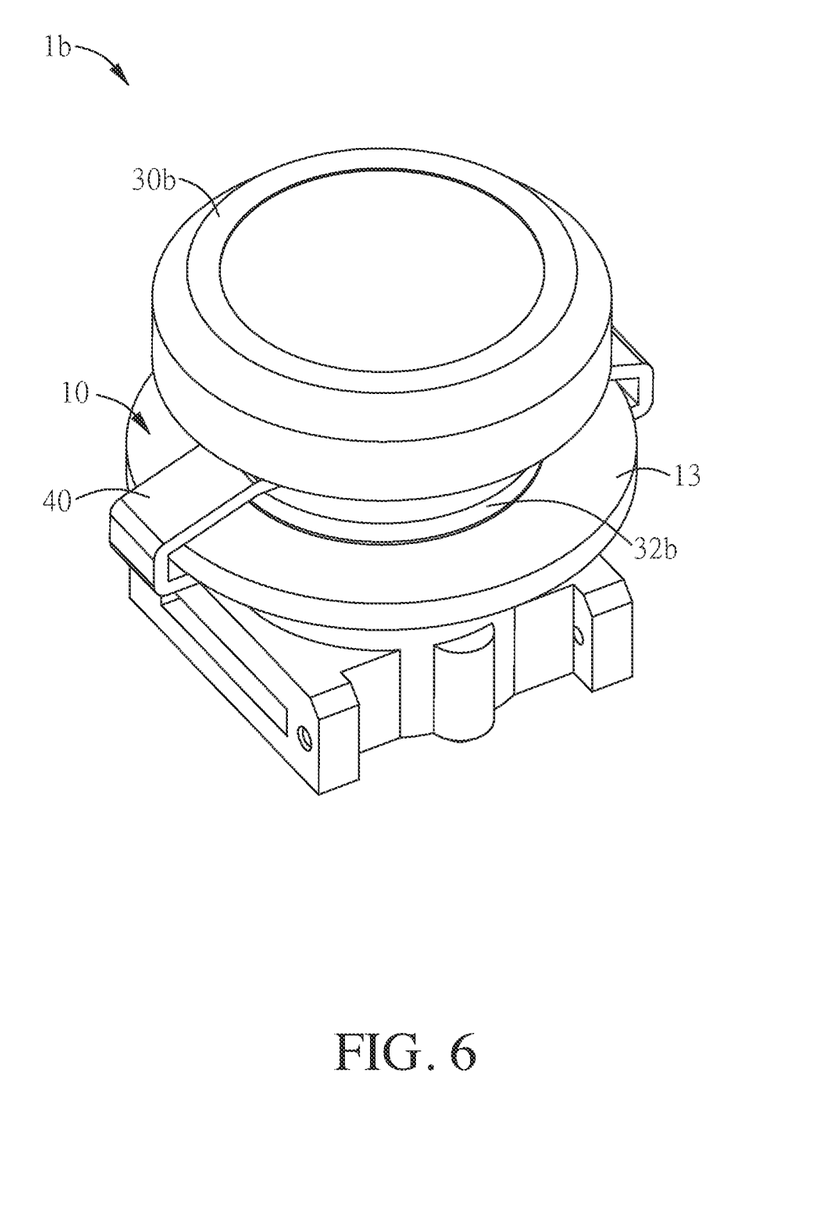
FIG. 6 illustrates a sectional view of a lens device according to the third embodiment of the present disclosure.
Figure 7:
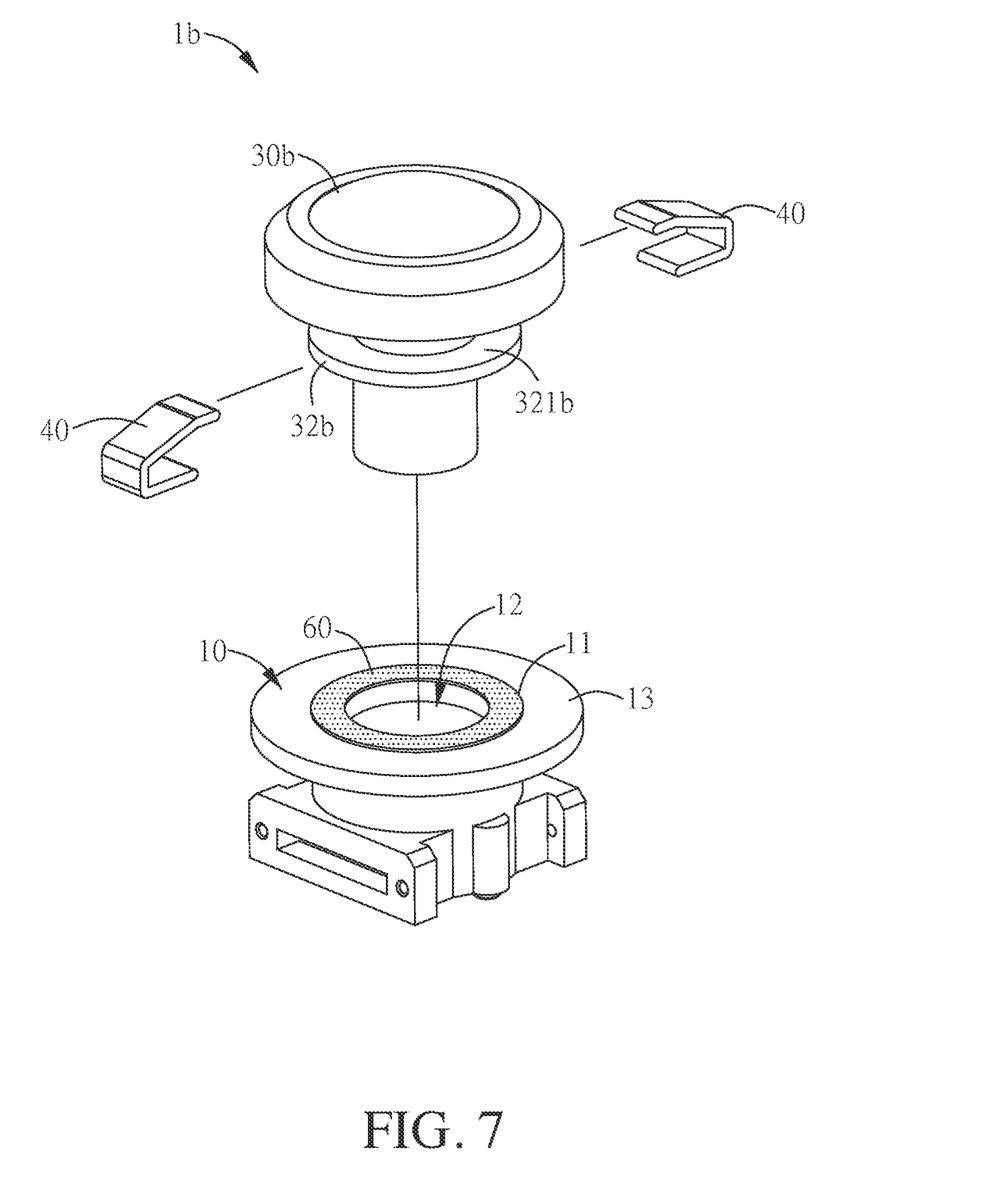
FIG. 7 illustrates an exploded view of the lens device shown in FIG. 6.
Figure 8:
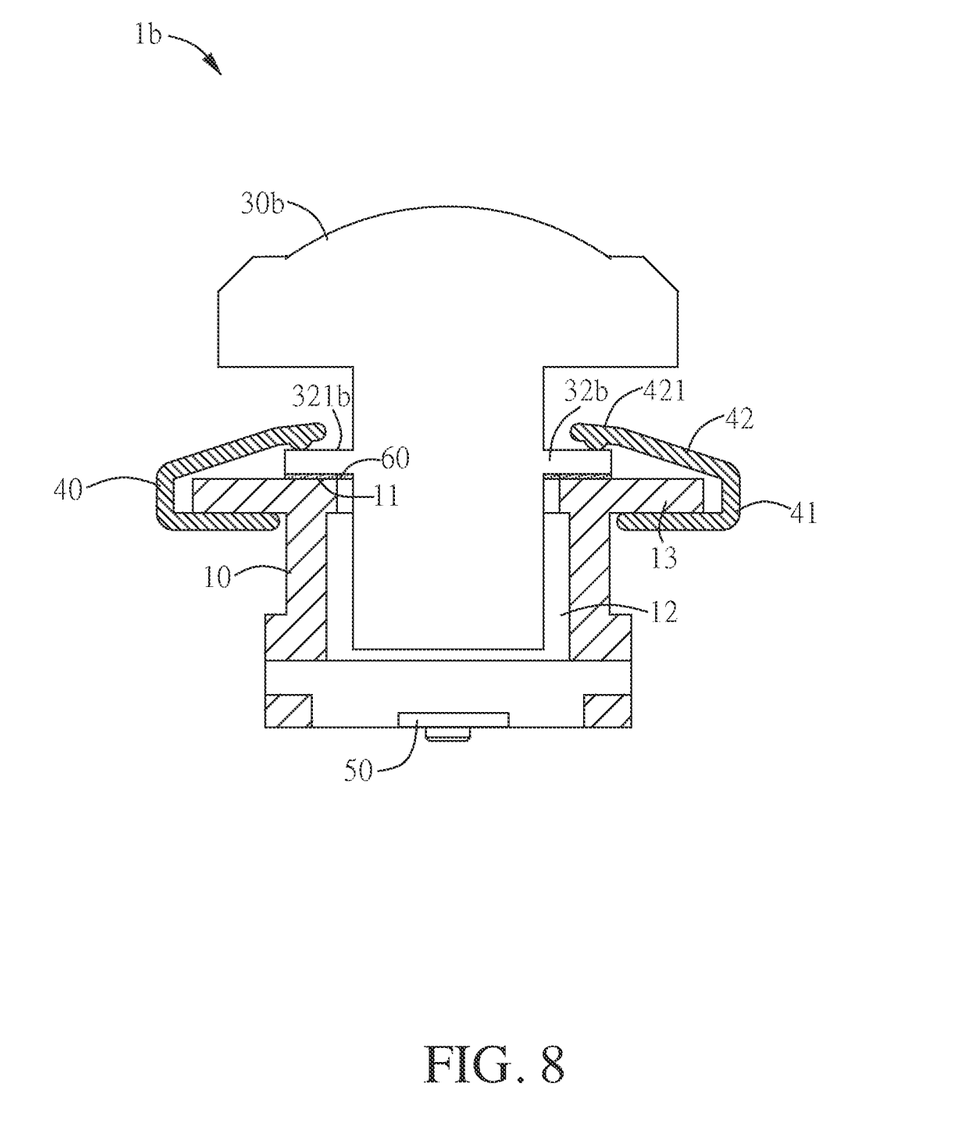
FIG. 8 illustrates a sectional view of the lens device shown in FIG. 6.

Please refer to FIG. 6, FIG. 7 and FIG. 8. FIG. 6 illustrates a sectional view of a lens device according to the third embodiment of the present disclosure; FIG. 7 illustrates an exploded view of the lens device shown in FIG. 6; and FIG. 8 illustrates a sectional view of the lens device shown in FIG. 6. In this embodiment, the lens device 1b comprises a holder 10, a lens module 30b, at least one clamping member 40, an image sensor 50 and an adhesive 60. The structures of the holder 10, the clamping member 40, the image sensor 50 and the adhesive 60 are the same as those in the first embodiment, with the same reference numerals denoting the same elements. In this embodiment, the holder 10 also comprises a mounting plane 11, an accommodating portion 12 and an extension portion 13. The lens module 30b comprises a connection portion 32b, and the connection portion 32b is located on an outer side wall of the lens module 30b. Part of the lens module 30b is disposed in the accommodating portion 12, and the connection portion 32b is disposed on the mounting plane 11.

In this embodiment, the relative positions of the lens module 30b and the image sensor 50 on the plane can be adjusted by moving the lens module 30b right and left so that the lens module 30b can be fixed to a position that can maintain the predetermined imaging focal length from the image sensor 50. Similarly, the UV cured adhesive 60 or the heat cured adhesive 60 is disposed on the mounting plane 11 of the holder 10. After the focusing of the lens module 30b, the adhesive 60 is cured by using light (UV) irradiation or heating, and the adhesive 60 connects the holder 10 and the connection portion 32b of the lens module 30b to fix the relative positions of the holder 10, the lens module 30b and the adhesive 60.

In this embodiment, the clamping member 40 is used to further fix the relative positions of the holder 10 and the lens module 30b to prevent a change in the relative positions caused by a loss of function of the adhesive 60 due to the duration of use and environmental factors. The clamping member 40 comprises an engagement portion 41 and an elastic arm 42. The engagement portion 41 clamps the extension portion 13 of the holder 10. In this embodiment, the engagement portion 41 also has at least one bend portion 411 which corresponds to an edge of the extension portion 13, such that the engagement portion 41 is able to fit the lower surface of the extension portion 13.

Part of the elastic arm 42 touches a surface of connection portion 32b of the lens module 30b, and the surface is opposite to the mounting plane 11 (i.e., an upper surface 321b of the connection portion 32b), such that the elastic arm 42 can apply a force on the lens module 30b, and the three is toward the mounting plane 11 (i.e., a downward force). Similarly, the elastic arm 42 extends from the engagement portion 41 and has a pressing portion 421. In other words, one end of the elastic arm 42 connects to the engagement portion 41, and the other end of the elastic arm 42 comprises the pressing portion 421. In this embodiment, the pressing portion 421 touches the upper surface 321b of the connection portion 32b. Thus, the clamping member 40 can fix the relative positions of the holder 10 and the lens module 30b such that the lens module 30b can be fixed at a position that maintains the predetermined imaging focal length from the image sensor 50.

As described above, according to the lens device of the present disclosure, the lens device comprises a clamping member, and the clamping member comprises an engagement portion and an elastic arm. The engagement portion clamps the holder, and part of the elastic arm touches the calibrated member or the connection portion of the holder to fix the relative positions of the holder and the lens module. Specifically, the adhesive that connects the calibrated member and the lens module, or the adhesive that connects the holder and the lens module, may lose its function due to duration of use or environmental factors, thereby causing the relative positions of the lens and the holder to shift. With the installation of the clamping member, the effect of preventing the relative positions between the base holder and the lens module from shifting due to failure of the adhesive can also be achieved.

It is noted that the above-described embodiments are merely illustrative of preferred embodiments of the present disclosure, and that in order to prevent redundancy, not all possible combinations of variations are described in detail; various changes and modifications may be made to the described embodiments without departing from the scope of the disclosure as described by the appended claims.

What is claimed is:

1. A lens device, comprising:
   a holder comprising a mounting plane and an accommodating portion;
   a calibrated member disposed on the mounting plane and having a through hole and an internal thread; a lens module comprising an external thread, wherein the lens module passes through the through hole of the calibrated member, the external thread and the internal thread fit each other, and part of the lens module is disposed in the accommodating portion; and
   a clamping member comprising an engagement portion and an elastic arm, wherein the engagement portion clamps the holder, and part of the elastic arm touches a surface of the calibrated member opposite to the mounting plane.

2. The lens device as claimed in claim 1, wherein the elastic arm extends from the engagement portion and has a pressing portion, and the pressing portion touches the surface of the calibrated member opposite to the mounting plane.

3. The lens device as claimed in claim 2, wherein one end of the elastic arm connects to the engagement portion, and the other end of the elastic arm comprises the pressing portion.

4. The lens device as claimed in claim 2, wherein the elastic arm has a first positioning portion, the calibrated member has a second positioning portion, and the first positioning portion fits the second positioning portion.

5. The lens device as claimed in claim 1, wherein the holder comprises an extension portion, and the engagement portion clamps the extension portion.

6. The lens device as claimed in claim 5, wherein the engagement portion is located on at least one end of the clamping member, and the engagement portion has at least one bend portion corresponding to an edge of the extension portion.

7. The lens device as claimed in claim 5, wherein the engagement portion has a third positioning portion, the holder has a fourth positioning portion, and the third positioning portion fits the fourth positioning portion.

8. The lens device as claimed in claim 1, further comprising:
   an adhesive, which is disposed on the mounting plane of the holder and connects the holder and the calibrated member.

9. The lens device as claimed in claim 1, further comprising:
   an image sensor, which is disposed on a bottom side of the accommodating portion and corresponds to the lens module.

10. A lens device, comprising:
    a holder, comprising a mounting plane and an accommodating portion;
    a lens module, comprising a connection portion, wherein part of the lens module is disposed in the accommodating portion, and the connection portion is disposed on the mounting plane; and
    a clamping member, comprising an engagement portion and an elastic arm, wherein the engagement portion clamps the holder, and part of the elastic arm touches a surface of the connection portion opposite to the mounting plane.

11. The lens device as claimed in claim 10, wherein the elastic arm extends from the engagement portion and has a pressing portion, and the pressing portion touches the surface of the connection portion opposite to the mounting plane.

12. The lens device as claimed in claim 11, wherein one end of the elastic arm connects to the engagement portion, and the other end of the elastic arm comprises the pressing portion.

13. The lens device as claimed in claim 10, wherein the holder comprises an extension portion, and the engagement portion clamps the extension portion.

14. The lens device as claimed in claim 13, wherein the engagement portion is located on at least one end of the clamping member, and the engagement portion has at least one bend portion corresponding to an edge of the extension portion.

15. The lens device as claimed in claim 10, further comprising:
   an adhesive; which is disposed on the mounting plane of the holder and connects the holder and the connection portion of the lens module.

\* \* \* \* \*